United States Patent
Clouet et al.

(10) Patent No.: US 9,621,261 B2
(45) Date of Patent: Apr. 11, 2017

(54) METHOD AND ARRANGEMENT FOR CHANNEL SET UP IN AN OPTICAL WDM-NETWORK

(75) Inventors: Benoit Clouet, Munich (DE); Anton Schex, Germering (DE)

(73) Assignee: Xieon Networks S.a.r.l., Luxembourg (LU)

(*) Notice: Subject to any disclaimer, the term of this patent is extended or adjusted under 35 U.S.C. 154(b) by 93 days.

(21) Appl. No.: 14/410,907

(22) PCT Filed: Jul. 26, 2012

(86) PCT No.: PCT/EP2012/061753
§ 371 (c)(1),
(2), (4) Date: Jun. 1, 2015

(87) PCT Pub. No.: WO2014/015888
PCT Pub. Date: Jan. 30, 2014

(65) Prior Publication Data
US 2015/0256252 A1 Sep. 10, 2015

(51) Int. Cl.
*H04J 14/02* (2006.01)
*H04B 10/077* (2013.01)

(52) U.S. Cl.
CPC .......... *H04B 10/0775* (2013.01); *H04J 14/02* (2013.01); *H04J 14/0221* (2013.01)

(58) Field of Classification Search
CPC ................................................. H04J 14/0221
See application file for complete search history.

(56) References Cited

U.S. PATENT DOCUMENTS 5,513,029 A   4/1996 Roberts
6,043,915 A * 3/2000 Giles ................... H04B 10/077
                                                398/1

(Continued)

FOREIGN PATENT DOCUMENTS

EP    1076434 A2    2/2001
WO    2004107625 A1   12/2004
WO    2014015888 A1    1/2014

OTHER PUBLICATIONS

International Search Report, PCT/EP2012/061753, dated Dec. 17, 2012.

*Primary Examiner* — Nathan Curs
(74) *Attorney, Agent, or Firm* — Nelson Mullins Riley & Scarborough LLP

(57) ABSTRACT

The invention refers a method and an arrangement for channel set up in an optical network. An optical signal path is configured for a certain optical channel signal (OC1) of a WDM-signal. This channel signal (OC1) is on-off-modulated by a modulation test signal (MT1) having a predetermined lower frequency and is generating a channel test signal (OT1). This channel test signal (OT1) is combined with other optical channels (OC2-OCn) to the WDM-signal (WS) and transmitted via said path. At a start node (1) or a downstream node (3, 5) a measurement signal (EMI, EM3) is derived from the complete WDM-signal (WS) without wavelength de-multiplexing. The measurement signal (EMI, EM3) is compared with a correlation signal (MC1) and an obtained power level (PC1) is used to adjust the channel power (PC1, PC2, PC3) to achieve predetermined target power values (PC1-PC4) at different power monitoring points (19, 40, 41, 58). The adjustment step is repeated for all downstream nodes (3, 5) and all further channel signals (OC2-OCn).

18 Claims, 1 Drawing Sheet

(56) References Cited

U.S. PATENT DOCUMENTS

| | | | |
|---|---|---|---|
| 6,735,395 B1* | 5/2004 | Bai | H04B 10/504 |
| | | | 372/31 |
| 7,664,397 B2 | 2/2010 | Yuki et al. | |
| 2002/0024690 A1* | 2/2002 | Iwaki | H04B 10/03 |
| | | | 398/13 |
| 2003/0035171 A1* | 2/2003 | Touma | H04B 10/506 |
| | | | 398/79 |
| 2003/0165286 A1* | 9/2003 | Ikushima | H04B 10/00 |
| | | | 385/24 |
| 2004/0109685 A1* | 6/2004 | Wan | H04B 10/25073 |
| | | | 398/41 |
| 2006/0029391 A1 | 2/2006 | Yuki et al. | |
| 2012/0063771 A1* | 3/2012 | Sugaya | H04B 10/2935 |
| | | | 398/26 |

* cited by examiner

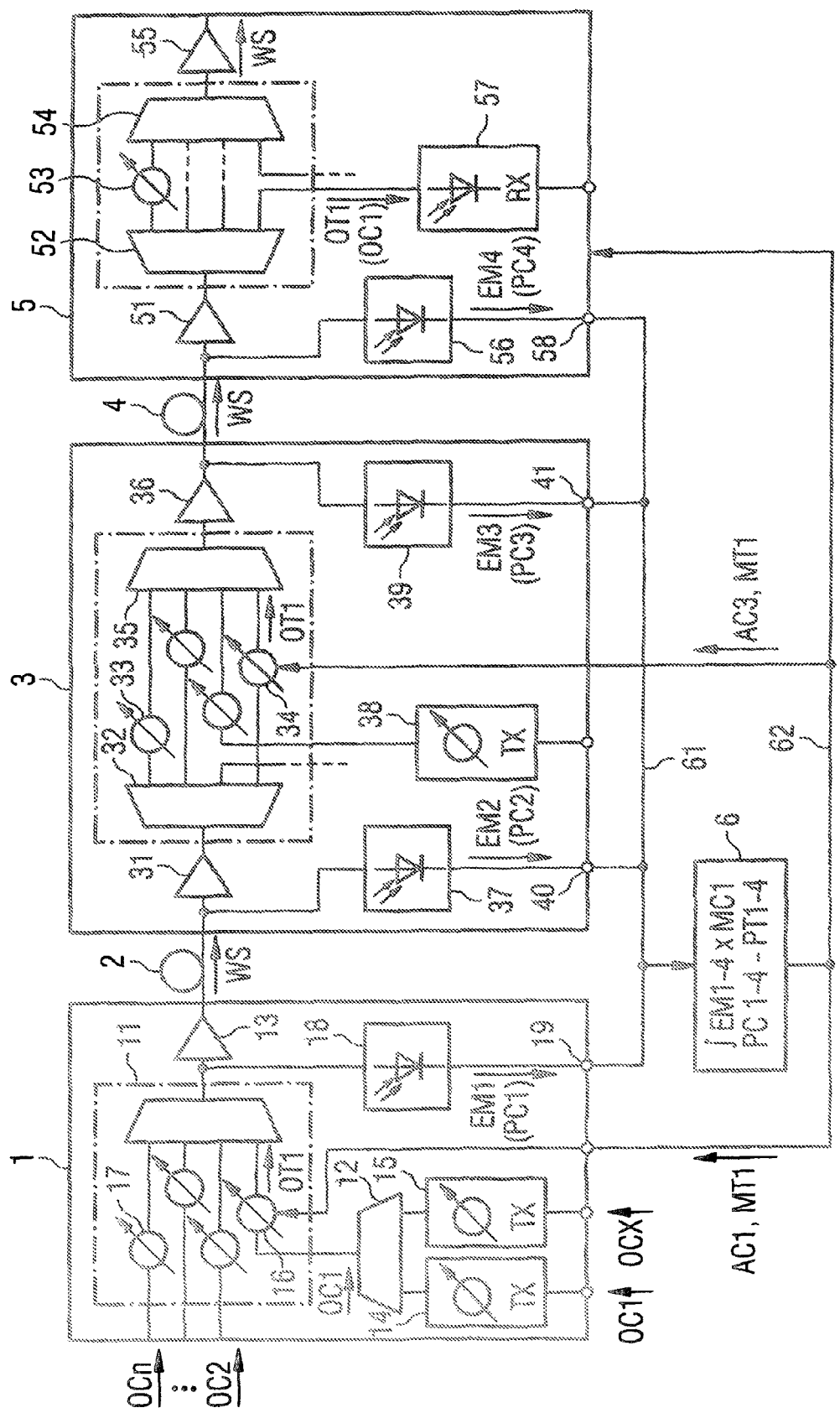

METHOD AND ARRANGEMENT FOR CHANNEL SET UP IN AN OPTICAL WDM-NETWORK

CROSS REFERENCE TO RELATED APPLICATIONS

This application is a U.S. National Phase Application under 35 U.S.C. 371 of International Application No. PCT/EP2012/061753, filed on Jul. 26, 2012, which is incorporated herein by reference in its entirety.

FIELD OF THE INVENTION

The invention refers to a simple method and an arrangement for channel set up in an optical WDM-network. In addition the invention allows tracing of an optical channel signal in the network.

BACKGROUND OF THE INVENTION

In optical transport network WDM-signals [Wavelength Division Multiplex] are transmitted via optical fibers between a plurality of network nodes. A WDM-signal is composed of a plurality of optical channel signals, each channel signal is transmitted in an allocated channel with a corresponding wavelength via an optical path between the network nodes. Specifically in long-haul networks adjustments of channel signal power levels is required to ensure that certain target powers like amplifier input and/or output powers are reached at certain points such as nodes or a receiver.

The power measurements can be done at these places using external devices. Alternatively specific methods like pilot tones modulated onto the optical signals allow it to measure the received power levels, but they require complex arrangements.

RELATED ART

U.S. Pat. No. 5,513,029 discloses a method and an apparatus for monitoring performances of optical transmission systems. Dither signals are used to encode optical signals. These dither signals are separated from high speed signal modulation and monitored at amplifier ports and they allow to measure both noise and signal power. Relative signal power may be controlled based on measured values.

Document WO 2004/107625 describes a method and a system for identification of channels in an optical network. One of the common methods for the identification of a channel was to modulate the channel with a low frequency tone, where the tone uniquely identifies the channel. According to the described invention there is provided a method for identifying an optical channel by marking the channel with a unique combination of two or more identifying tags referred to as channel signature. Preferable the identifying tags are low frequency dither tones encoded onto that channel carrier.

The U.S. Pat. No. 7,664,397 B2 describes an optical network system enabling confirmation of connection and tracking of wavelength paths at a high speed and a low cost without introducing any special hardware by having a wavelength path monitoring unit in an management system, a change generating unit to give temporary change of e.g. optical power to an optical signal emitted from an optical transmitting/receiving node, and a change detecting unit to confirm that this change of optical power has propagated through an optical transmission line and appeared at each node on the way, and confirming connections and monitoring the wavelength path while confirming the presence of the change.

Some of the descried methods require specific and comprehensive arrangements in the network elements, especially comprehensive measuring equipment.

OBJECTS AND SUMMARY OF THE INVENTION

It is an object of the invention to provide a method and an arrangement for channel set up (channel signal power adjustment of the WDM-system) with reduced complexity which is suited for long haul systems.

This invention allows to overcome some of the disadvantages of previous methods such as inaccuracy of power measurement induced e.g. by optical amplifiers (spectral hole burning, power limitation, gain compression) or Raman induced power transfer in transmission fibers, avoiding deployment of complex specific equipment for the power measurement.

The object of the invention is achieved in system transmitting a WDM-signal by configuring a signal path between a start node, via at least one intermediate node, and a last node for an optical channel signal transmitted in an optical channel of the WDM-signal, on-off modulating at the start node said optical channel signal with a modulation test signal generating a channel test signal, transmitting said channel test signal via said optical channel of the WDM-signal, tapping at a downstream monitoring port an electrical measurement signal derived from the WDM-signal, deriving a power level of said channel test signal by applying a correlation method between the electrical measurement signal and a correlation signal corresponding to said modulation test signal during a sufficient long time, calculating a control command from the difference between the measured power level and a target power value allocated to said optical channel signal at a power monitoring point, setting an output power level of said optical channel signal in the start node according to the control signal to obtain the allocated target power value, and setting the output power level of the channel signal in further downstream nodes to obtain further allocated target power values at further downstream power monitoring points.

The advantage of this method is that the power level of a channel signal is derived from the WDM-signal without previous wavelength de-multiplexing. The method can be designed without great expenditure. Even already existent optical-electrical converters of the amplifiers can be used for measuring purposes. At the test signal emitting network node an adjustable VOA ability is advantageously used for on-off modulation. Each optical channel signal can be selected and modulated separately. So, the channel power level of an emitted or a received channel signal can be optionally adjusted.

In a preferred embodiment the optical channel signals are not only modulated by the modulation test signal at the start node but also at the intermediate nodes to improve the quality of the channel test signal since the signal quality of a transmitted channel test signal is impacted by e.g. intermediate optical amplifiers.

In addition, the invention allows channel tracing by detecting the channel test signal at downstream measuring ports.

Further developments of the invention are described in depending method claims and in arrangement claims.

BRIEF DESCRIPTION OF THE DRAWING

An example of a presently preferred embodiment is described below with reference to an accompanying drawing, where a FIGURE shows a basic arrangement of an optical wavelength path in an optical network transmitting a channel test signal.

DETAILED DESCRIPTION OF THE INVENTION

The FIGURE illustrates an optical fiber link. Only two spans of an optical network for transmitting a WDM-signal [Wavelength Division Multiplex] WS are shown for reasons of clarity. A start node 1 is connected via a first optical fiber 2 to an intermediate node 3 (only one of a plurality of intermediate nodes connected in series is shown). The intermediate node 3 is connected via a further optical fiber 4 with a last node 5. The terms start, intermediate and last node refer to nodes of an optical wavelength path for a certain optical channel signal OC1 of the WDM-signal, beginning at the start node 1, where this optical channel signal OC1 is added to the WDM-signal (or where a channel test signal is generated) and transmitted along that path to a receiver 57 of the last node 5 where the regarded channel signal is dropped (or where channel tracing and power adjustment is finished). Only the necessary elements of the nodes for explaining the invention are shown.

An embodiment of the start node 1 comprises one or more optical devices 11 with controllable VOA [variable optical attenuator] ability. These optical devices may comprise wavelength-de-multiplexers receiving WDM-signals (not shown in node 1), wavelength-multiplexers like 12, and discrete VOA-elements 16, 17, . . . . Preferable optical devices are wavelength selective switches [WSS]. The WS-switches comprise beside switching ability a separately controllable attenuation ability for each optical channel signal, in the FIGURE depicted as VOAs.

A first optical channel signal OC1 is e.g. output by an optical transmitter [TX] (transponder) 14. In this embodiment alternatively another optical channel signal OCX output by a second optical transmitter 15 could be added. The chosen optical channel signal OC1 is combined with a plurality of further channel signals OC2-OCn to the WDM-signal WS as mentioned above, amplified by an optical booster (amplifier) 13, and transmitted via the first optical fiber 2. A measurement signal is branched of the WDM-signal at the input of the booster 13 and converted by an optical-electrical converter (photo diode) 18 into an electrical measurement signal EM1.

The VOA function preferable of the WSS 11 (or/and the optical transmitter 14 or WSS 12), depicted as VOA 16, is used for modulating the optical channel signal OC1 with a modulation test signal MT1 to be traced and/or adjusted. Only this channel signal is regarded for explaining the invention. In a turn on phase the channel signal is an un-modulated optical carrier or already modulated with a data signal, and in an operating state the channel signal is usually a data signal. This signal is on-off modulated e.g. with a low frequency modulation test signal, e.g. a 1010-signal or a special channel signature generating said optical channel test signal, referred to as channel test signal OT1 with an amplitude of the optical channel signal OC1. As a channel signature a consecutively repeated channel number, preferably an equal weight codeword, or a CDMA [Code Division Multiple Access] codeword [chip] may be used.

The generated channel test signal OT1 is—as the channel signal OC1 before—wavelength multiplexed with said further optical channel signals OC2-OCn and then transmitted as WDM-signal WS via the optical fiber 2 to the next downstream intermediate node 3.

The intermediate node 3 comprises a pre-amplifier 31 receiving the WDM-signal WS (the same name is used for the WDM-signal transmitted along the shown path, even if some channels may be dropped or added), one optical device 32-35—preferable a WSS circuit (or a plurality of devices), and a booster 36. The function of the WSS is depicted as combination of a de-multiplexer 32, VOAs 33, 34, . . . , and a multiplexer 35. In the node some received channel signals may be dropped and new channel signals may be added via a further optical transmitter 38. The output WDM-signal comprising the regarded channel signal OC1 or the channel test signal OT1 respectively is transmitted via the further optical fiber 4 and via further intermediate nodes (not shown) to the last node 5. Optical-electrical converters (photo diodes) 37 and 39 are connected to an input (or output) of the pre-amplifier 31 and the output (or input) of the booster 36 outputting electrical measurement signals EM2 and EM3.

The arrangement of the last node 5 complies with the arrangement of the intermediate node. It comprises a pre-amplifier 51, an optical device, WSS, 52-54, an output booster 55, an optical-electrical converter 56 connected to an input (or output) of the pre-amplifier 51, and a channel receiver [RX] 57. The regarded optical channel signal OC1 is fed to said receiver 57 representing an end of the regarded signal path. The optical-electrical converters in all nodes are already components of gain controls of the amplifiers 13, 31, 36, 51.

The shown amplifiers are regarded as constant gain controlled. Of course, additional functions as setting the gain control or tilt may be also implemented.

For tracing the optical channel test signal OT1 emitted from the first node 1 the electrical measurement signals EM2, EM3, EM4 are derived from the received optical WDM-signal WS and may be tapped at power monitoring ports 40, 41, 58 of the downstream nodes 3 and 5. Each tapped measurement signal EM2, EM3 and EM4 is correlated with a correlation signal MC1 which corresponds to the modulation test signal MT1 of the regarded channel test signal OT1. The modulation test signal MT1 is detected e.g. by recognizing a certain clock signal or a channel signature and the channel test signal OT1 can by reliably traced.

If different channel signatures are allocated to the optical channel test signals OT1, . . . different corresponding correlation signals MC1, . . . corresponding to the modulation test signals MT1, . . . have to be applied. As known to those skilled in the art, a synchronisation of the correlated signals is not necessary if a correlation signal with a slightly different frequency is used.

Due to the properties of on-off keying for a system set up or for failure searching only low predetermined power levels of the channel signals are necessary and may be applied for safety reasons. The attenuations of the VOAs are first set to high values and the estimated low output power values are checked before the predetermined low values are adjusted.

Different features of channel power level settings will now be regarded.

First, adjusting of output power levels of the channel signals, e.g. for pre-emphasis setting, is considered. First, the output power levels of the start node are adjusted. The power levels of channel signals OC1-OCn have to be derived from the WDM-signal without complex equipment. A wavelength de-multiplexer is not necessary. For reasons of simplification, again, only the power level adjustment of the first channel signal OC1 is regarded. As described above, a channel test signal OT1 is generated in the start node 1 first. A measurement signal is branched off the WDM-signal WS at the input (or output) of the constant gain controlled booster 13, and converted by the optical-electrical converter 18 into the electrical measurement signal EM1 (output power monitoring port 19). This measurement signal EM1 is correlated with a correlation signal MC1 in a service device 6 for obtaining the channel output power level PC1 of said channel test signal OT1. A sufficient long correlation period is necessary to achieve reliable results. Because on-off keying is used the amplitude of the regained low frequency modulation signal corresponds to the power level of the channel test signal OT1 and therefore to the power of the optical channel signal OC1. The obtained power level PC1 is compared with a target power value PT1 and the power level of the channel test signal OT1 is adjusted to said target power value PT1, e.g. by setting the attenuation of the VOA 16 in the path of the optical channel test signal.

According to a preferable method, the necessary attenuation of the allocated VOA 16 is calculated and set (or e.g. output power of transmitter 14 is set). The power adjustment could be carried out in small steps. Another adjustment possibility is to compare the measured power level with the target power and to rise and decrease the attenuation/channel power level in small steps in a control loop till the target power PT1 is reached.

After the output power level of at least the channel test signal OT1 in the start node 1 is adjusted, the output power level of the channel test signal OT1 at the first downstream intermediate node 3 has to be adjusted. In this node a measurement signal is derived (as an example only showing a second possibility) from the output signal of the booster 36 and converted by the optical-electrical converter 39. The output electrical measurement signal EM3 at output power monitoring port 41 is correlated with said correlation signal MC1, and an obtained channel output power level PC3 is compared with an allocated target value PT3. Then, according to the difference the output power level of the channel test signal OT1 is adjusted by setting the optical device 32-35. In addition, it is also possible to derive power signals from the input and from the output of the amplifiers for supervising the amplifier function.

Thereafter, the channel output power levels of further downstream nodes are adjusted (the same reference signs are used for the signals WS and OT1 on their path from the start node to the last node).

Of course, for a system or pre-emphasis set up it is preferable to adjust first the output power levels of all channel signals OC1-OCx node by node. If different channel signatures are used, parallel adjusting of the channel power levels is possible.

The signal quality decreases with the length of the optical path due to amplifier ASE and other signal impairments. Therefore, to improve the accuracy of the power measurements the adjustments can be carried out in a preferred second embodiment span by span (between two adjacent nodes or between respectively only few spans respectively). In the preferred embodiment of the invention the output power level of the channel signal OC1 (or of a plurality of channel signals OC1-OCn) output from the first node 1 is adjusted as described above. Then the optical channel signal OC1 is on-off modulated in the next downstream intermediate node 3 by the modulation test signal MT1 generating the channel test signal OT1 with high signal quality. The attenuation ability of the optical device/WSS 32-35 is in addition used for amplitude modulation avoiding additional complex arrangements, depicted in the FIGURE as modulating VOA 34. The channel output power level PC3 of the channel test signal OT1 is again derived from the measurement signal branched off the WDM-signal WS at the output (or input) of the booster 36. The channel output power is adjusted as described above.

The channel power adjustment is then repeated for further channels in the same node or/and at further downstream nodes respectively. In this preferred embodiment, modulation of a channel signal generating the channel test signal, deriving the allocated measurement signal, and adjustment of the channel output power level are always performed in the same node.

Second, adjusting of the input power levels of the nodes is considered. Again, for reasons of clarity, only the power adjustment of the optical channel signal OC1 is described in detail. The channel test signal OT1 is generated in the start node 1 and transmitted to the first downstream intermediate node 3. The power level of the channel test signal OT1 is reduced by the attenuation of the fiber 2 and further physical effects. A measurement signal EM2 (power monitoring point 40) corresponding to the WDM-signal WS is branched off at an input or output of the pre-amplifier 31. If the input is used, the power adjustment is possible without activating this amplifier.

As explained above, a channel input power level PC2 of the received channel test signal OT1 is obtained from the measurement signal EM2. This power level is compared with an allocated target power value PT2, and the output power level of the channel signal OT1/OC1 of the next upstream node (start node) 1 is set by controlling the output channel power, in this example the attenuation of the VOA 16.

This adjustment routine is repeated for all downstream nodes and till the input power level at the last node 5 is adjusted. In node 5 the input power level PC4 of the channel test signal OT1 is derived from the measurement signal EM4, output from the optical-electrical converter 56 at a power monitoring point 58. Again, the input power level adjustment is performed by setting the attenuation of the optical device/WSS 32-35 (VOA34) of the previous upstream node 3 till an allocated target value PT4 of the received channel test signal OT1 and therefore channel signal OC1 is achieved. After the whole path is adjusted the channel signal OC1 is transmitted (the channel signals OC1-OCn respectively).

Of course, to improve accuracy the channel power adjustment may be repeated for all optical channel signals also span by span in the preferred second embodiment as described above. The channel test signal OT1 is then generated successively in the nodes 1 and 3 and transmitted to the next downstream node, where the measurement signal for obtaining the channel input power level is derived. The input power level is then adjusted by adjusting the signal attenuation of all or selected channel test signal in the next upstream node.

Again, as described above, in a set up phase or pre-emphasis set up it is preferable to adjust the input power levels of all channel signals span by span by adjusting the VOAs of the preceding nodes till all input power levels of all nodes are adjusted.

The FIGURE shows also the already mentioned service device 6 for performing all the calculations described above. The measurements signals EM1-EM5 are transmitted via a first service channel 61 from the optical-electrical converters 18, 37, 39, 56 to the service device, and service commands AC1, AC3 are forwarded via a second service channel 62 to the nodes for adjusting the channel output power levels, e.g. by adjusting the attenuation of the WSSs. These signals may be transmitted as digital optical signals. The correlation of the measurement signals EM1-4 is depicted as ∫ME1-4× MC1 and the comparison for each of the of the obtained power values with the allocated target values as PC1-4-PT1-4. The modulation signals MT1, . . . may also be forwarded with the control commands. The channel tracing and/or power adjustment may be automated. On the other hand, if only output power adjustment is necessary in a transmission system and the adjustments are done locally at the nodes, the service channels are not necessary.

The present invention is not limited to the details of the above described principles. The scope of the invention is defined by the appended claims and all changes and modifications as fall within the equivalents of the scope of the claims are therefore to be embraced by the invention. Especially different methods realizing on-off keying, different correlation methods for obtaining the channel powers and different methods of channel power adjustment may be used.

REFERENCE SIGNS AND ABBREVIATIONS 1 start node
11 optical device/WSS
12 optical device/WSS
13 booster amplifier
14 optical transmitter
15 optical transmitter
16 VOA
17 VOA
18 optical-electrical cvonverter
19 output power monitor port
2 optical fiber
3 intermediate node
31 pre-amplifier
32 wavelength-demultiplexer
33 VOA
34 VOA
35 wavelength-multiplexer
32-35 optical device/WSS
36 booster
37 optical-electrical converter
38 optical transmitter
39 optical-electrical converter
40 input power monitor port
41 output power monitor port
4 optical fiber
5 last node
51 pre-amplifier
52 wavelength demultiplexer
53 VOA
54 wavelength multiplexer
52-54 optical device/WSS
55 booster
56 optical-electrical converter
57 optical receiver
58 power monitoring port
6 service device
61 first service channel
62 second service channel
OC1 (first) optical channel signal
OC1-OCX channel signals
WS WDM-signal
MT1 (first) modulation test signal
OT1 (first optical) channel test signal
MC1 (first) correlation signal
AC1 control command
AC3 control command
PC1 channel output power level at output power monitoring port 19
PC2 channel input power level at power monitoring port 40
PC3 channel output power level at 41
PC4 channel input power level at 58
PT1 (first) target power value
EM1/2/3/4 electrical measurement signal

The invention claimed is:

1. Method for channel set up in an optical WDM-network transmitting a Wavelength Division Multiplex (WDM)-signal via optical channels, comprising the steps of
    configuring a signal path between a start node, via at least one intermediate node, and a last node for an optical channel signal transmitted in an optical channel of the WDM-signal,
    on-off modulating at the start node said optical channel signal with a modulation test signal generating a channel test signal,
    transmitting said channel test signal via said optical channel of the WDM-signal,
    tapping at a downstream monitoring port an electrical measurement signal derived from the WDM-signal,
    deriving a power level of said channel test signal by applying a correlation method between the electrical measurement signal and a correlation signal corresponding to said modulation test signal during a predefined time period,
    calculating a control command from the difference between a measured power level and a target power value allocated to said optical channel signal at a certain power monitoring point,
    setting an output power level of said optical channel signal in the start node according to the control command to obtain the allocated target power value, and
    setting the output power level of the channel signal in further nodes located downstream from said start node within said signal path to obtain further allocated target power values at further power monitoring points located downstream from said start node within said signal path.

2. The method according to claim 1, wherein for adjusting a channel output power level of an output channel signal the electrical measurement signal is derived from an emitted WDM-signal at an input or an output of a booster and tapped at an allocated output power monitoring port, and the channel output power level is set at a same node to obtain the allocated target power value.

3. The method according to claim 2, wherein for adjusting the channel output power level of the output channel signal, the optical channel signal is modulated at least one of the nodes located downstream from the start node within the signal path by the modulation test signal generating said channel test signal, and the electrical measurement signal is derived from the emitted WDM-signal at the input or the output of the booster and tapped at the allocated output power measurement port of a same node.

4. The method according to claim 1, wherein for adjusting a channel input power level of a received channel signal, the electrical measurement signal is derived from a received WDM-signal (WS) at an input or output of a pre-amplifier and tapped at an allocated input power monitoring port at least one of the nodes located downstream from the start node within the signal path, and the channel output power level of said channel signal at the next upstream node from said at least one of the nodes located downstream from the start node within the signal path is set to obtain the allocated target power value.

5. The method according to claim 4, wherein the optical channel signal is modulated at at least one of the nodes located downstream from the start node within the signal path by the modulation test signal generating said channel test signal, and the electrical measurement signal is derived from the received WDM-signal at the input or output of a pre-amplifier at the next downstream node from said at least one of the nodes located downstream from the start node within the signal path.

6. The method according to claim 1, wherein adjusting the output power level or an input power level is repeated for all channel signals of a node.

7. The method according to claim 1, wherein for channel tracing and/or for system set up the output power levels of the optical channel signals and channel test signals respectively are set at the start node and at the downstream nodes to a predetermined low power level.

8. The method according to claim 1, wherein the modulation test signal has a low frequency compared with the data rate of an optical channel signal.

9. The method according to claim 1, wherein the modulation test signal corresponds to a channel identifier.

10. The method according to claim 1, wherein the modulation test signal corresponds to an equal weight codeword or a CDMA (Code Division Multiple Access) chip sequence.

11. The method according to claim 1, wherein the output power level of the optical channel signal or channel test signal respectively is set by a VOA [variable optical attenuator] or an optical device with controllable attenuation ability, and that attenuation of the output power level is calculated and the VOA or the optical device is adjusted to achieve the target power value (PT1).

12. The method according to claim 1, wherein on-off-keying is performed by a variable optical attenuator (VOA) or an optical device receiving an modulation test signal.

13. The method according to claim 1, wherein an optical carrier or an optical data signal is modulated by the modulation test signal.

14. The method according to claim 1, wherein control commands and measurement signals are transmitted via service channels between the nodes and a service device, and/or the control commands are calculated at a service device.

15. The method according to claim 1, wherein gain and tilt of an optical amplifier comprised in said nodes is adjusted.

16. The method according to claim 1, wherein control commands and measurement signals are transmitted via service channels between the nodes and a service device, and wherein the measurement signals and/or control commands and/or the modulation test signals are transmitted between a service device and the nodes.

17. An arrangement for channel power set up in an optical network transmitting an optical channel signal in an optical channel of a wavelength division multiplex (WDM)-signal via an optical path with a start node, at least one intermediate node, and a last node, the arrangement being configured for:

configuring a signal path between a start node, via at least one intermediate node, and a last node for an optical channel signal transmitted in an optical channel of the WDM-signal, on-off modulating at the start node said optical channel signal with a modulation test signal generating a channel test signal, transmitting said channel test signal via said optical channel of the WDM-signal, tapping at a downstream monitoring port an electrical measurement signal derived from the WDM-signal, deriving a power level of said channel test signal by applying a correlation method between the electrical measurement signal and a correlation signal corresponding to said modulation test signal during a predefined time period, calculating a control command from the difference between a measured power level and a target power value allocated to said optical channel signal at a certain power monitoring point, setting an output power level of said optical channel signal in the start node according to the control command to obtain the allocated target power value, and setting the output power level of the channel signal in further nodes located downstream from said start node within said signal path to obtain further allocated target power values at further power monitoring points located downstream from said start node within said signal path.

18. The arrangement according to claim 17, comprising a service device connected via service channels to a start node, at least one intermediate node, and a last node, the service device being configured for receiving measurement signals, calculation of control commands, and remote control of the nodes.

* * * * *